US012754755B2

(12) United States Patent
Jatti et al.

(10) Patent No.: US 12,754,755 B2
(45) Date of Patent: Oct. 6, 2026

(54) ENABLE DIAL FOR OTT VIRTUALIZED APPLICATIONS

(71) Applicant: Thomson Licensing, Cesson-Sevigne (FR)

(72) Inventors: Vinod Jatti, Bangalore (IN); Sandeep Guddekoppa Suresh, Bangalore (IN); Mallika Subramanyam, Warrington, PA (US)

(73) Assignee: Thomson Licensing, Cesson-Sevigne (FR)

( * ) Notice: Subject to any disclaimer, the term of this patent is extended or adjusted under 35 U.S.C. 154(b) by 463 days.

(21) Appl. No.: 18/543,201

(22) Filed: Dec. 18, 2023

(65) Prior Publication Data

US 2024/0211298 A1 Jun. 27, 2024

Related U.S. Application Data

(60) Provisional application No. 63/434,762, filed on Dec. 22, 2022.

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
None
See application file for complete search history.

(56) References Cited

U.S. PATENT DOCUMENTS

2014/0006474 A1* 1/2014 White .............. H04N 21/44227 709/201
2017/0094345 A1* 3/2017 Zerr .................... H04N 21/6583
2022/0078249 A1* 3/2022 Singh .................... H04L 67/146

* cited by examiner

*Primary Examiner* — Mustafa A Amin
(74) *Attorney, Agent, or Firm* — James Shead; David Todd Shoneman; Michael A. Pugel

(57) ABSTRACT

To allow a second screen device to discover virtualized over-the top (OTT) application, a first screen device can act as a proxy DIAL server device. The proxy DIAL server device can utilize the DIAL protocol to communicate with the second screen device and transmit requests for one or more OTT applications from the second screen device to a network resource that hosts the one or more OTT applications. The proxy DIAL server device can act as a bridge between the second screen device and the network resource so as to facilitate the establishment of a communication connection between the second screen device and the network resource, for example, a virtual OTT application hosted by the network resource. Once the communication connection is established, the second screen device can request that content accessible via a selected virtual OTT application hosted by the network resource be displayed at the first screen device.

20 Claims, 4 Drawing Sheets

ENABLE DIAL FOR OTT VIRTUALIZED APPLICATIONS

BACKGROUND

Discovery and Launch (DIAL) is a protocol for discovering and launching applications on a single subnet, typically a home network. The DIAL protocol relies on Universal Plug and Play (UPnP), Simple Service Discovery Protocol (SSDP), and Hypertext Transport Protocol (HTTP). The DIAL protocol works without requiring a pairing between devices. The DIAL protocol enables a second screen device (for example, end-user devices such as a tablet, a computer, a mobile phone, etc.) to send content to a first screen device (for example, a television, a Blu-ray player, a set-top box (STB), etc.).

Over-the-top (OTT) applications provide services (such as streaming services) and communications over the Internet, bypassing traditional distribution methods. Previously, OTT applications ran on an end-user device. However, now, various sources provide different solutions by hosting OTT applications on a cloud server as virtual applications. When an OTT applications is hosted on a cloud server, as a virtual application, this leads to complications with using the DIAL protocol. For example, when an OTT application is running on an end-user device a second screen device can easily be detected, but when on served as a cloud application the feature to cast from a second screen device to a first screen device is not available or does not function properly. Thus, there is a need to bridge this gap in functionality when an OTT application is virtualized.

SUMMARY

The DIAL protocol provides for second screen devices or applications of second screen devices to discover and launch a first screen application on a first screen device. A first screen device can include a television, a Blu-ray player, a set-top box, etc. A second screen device can include a smartphone, a tablet, etc. A DIAL server is a network device that implements the server side of the DIAL protocol. A first screen device is usually a DIAL server. A DIAL client is a device that can discover and launch applications on a DIAL server and is usually a second screen device. A DIAL client discovers DIAL servers on the network using a DIAL service discovery or a discovery request using a UPnP SSDP protocol. The first screen device acting as a DIAL proxy server device for the OTT applications hosted at a cloud server. The first screen device acting as a proxy DIAL server device can support OTT applications being supported by the cloud server and mange and/or respond to REST service queries from second screen devices within proximity of the proxy DIAL server device. The proxy DIAL server device provides for discovery by the second screen device (also referred to as a DIAL client device) and establishment of a communication connection between a network resource that hosts one or more OTT applications (as virtualized applications) and the DIAL client device. In this way, the DIAL protocol can be extended without modifying the DIAL protocol specification. Additionally, the customer experience is enhanced as any product with DIAL support can be utilized including future cloud-based architecture for OTT applications.

An aspect of the present disclosure provides a proxy DIAL server device utilizing a DIAL protocol for establishing a connection between a virtual OTT application at a network resource and a DIAL client device. The proxy DIAL server device comprises a memory storing one or more computer-readable instructions and a processor configured to execute the one or more computer-readable instructions to receive an application list of one or more supported OTT applications from the network resource, send to the DIAL client device a response based on the application list, receive a launch OTT application request from the DIAL client device to launch an OTT application, wherein the application list comprises the OTT application, send a launch request to the network resource to launch the OTT application as the virtual OTT application based on the launch OTT application request, and establish a connection between the virtual OTT application and the DIAL client device.

In an aspect of the present disclosure, the processor is configured to execute one or more further instructions to send a created response to the DIAL client device based on the launch request.

In an aspect of the present disclosure, the processor is configured to execute one or more further instructions to receive an additional application response from the network resource.

In an aspect of the present disclosure, receive an additional application request from the DIAL client device.

In an aspect of the present disclosure, the processor is configured to execute one or more further instructions to receive an OTT application status associated with the virtual OTT application.

In an aspect of the present disclosure, the processor is configured to execute one or more further instructions to send additional application data to the DIAL client device.

In an aspect of the present disclosure, the processor is configured to execute one or more further instructions to send a created response to the DIAL client device based on an application status associated with the virtual application received from the network resource.

An aspect of the present disclosure provides a method for a proxy DIAL server device to establish a communication connection between a virtual application of a network resource and a DIAL client device. The method comprises receiving an application list of one or more supported OTT applications from the network resource, sending to the DIAL client device a response based on the application list, receiving a launch OTT application request from the DIAL client device to launch an OTT application, wherein the application list comprises the OTT application, sending a launch request to the network resource to launch the OTT application as the virtual OTT application based on the launch OTT application request, and establishing a connection between the virtual OTT application the DIAL client device.

In an aspect of the present disclosure, the method further comprises sending a created response to the DIAL client device based on the launch request.

In an aspect of the present disclosure, the method further comprises receiving an additional application response from the network resource.

In an aspect of the present disclosure, the method further comprises receiving an additional application request from the DIAL client device.

In an aspect of the present disclosure, the method further comprises receiving an OTT application status associated with the virtual OTT application.

In an aspect of the present disclosure, the method further comprises sending additional application data to the DIAL client device.

In an aspect of the present disclosure, the method further comprises sending a created response to the DIAL client device based on an application status associated with the virtual application received from the network resource.

An aspect of the present disclosure provides a non-transitory computer-readable medium of a proxy DIAL server device storing one or more computer-readable instructions for establishing a communication connection between a virtual application of a network resource and a DIAL client device. The one or more instructions when executed by a processor of the first screen device, cause the proxy DIAL server device to perform one or more operations including the steps of the methods described above.

The network device(s) or electronic apparatus(es) described herein, such as access point devices, extender access point devices, client devices (for example, a DIAL client device or a second screen device, a proxy DIAL server device or first screen device), and any other network devices, may be implemented as any of a residential network access point device, an electronic device (for example, a mobile phone, a computing device such as a notebook computer, or both) according to one or more embodiments. Thus, according to various aspects of the present disclosure described herein, it is possible for a DIAL client device to discover a proxy DIAL server device and to communicate with a virtual application of a network resource so as to cast content from the virtual application to the proxy DIAL server device.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
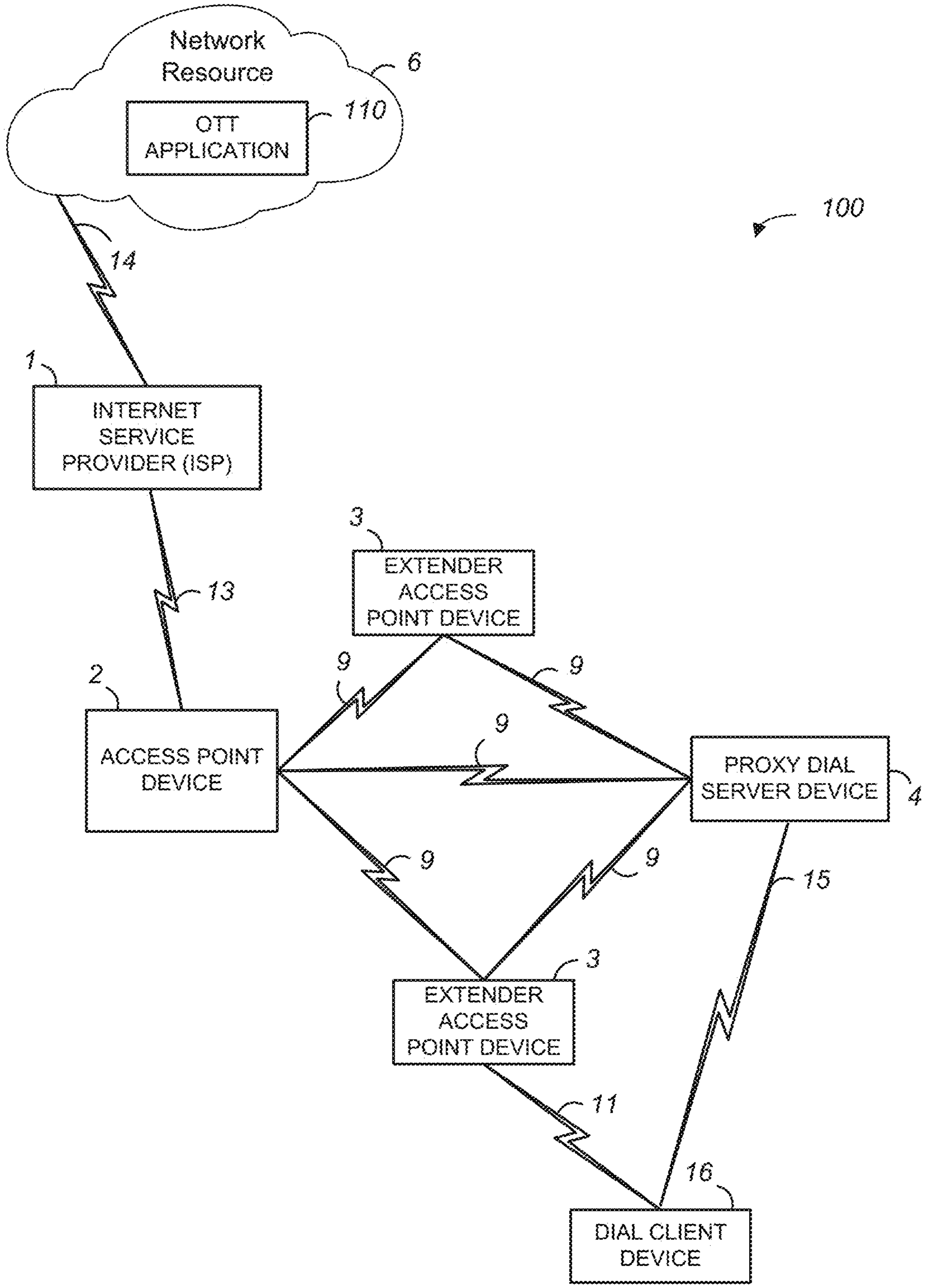
FIG. 1 is a schematic diagram of a network environment, according to one or more aspects of the present disclosure.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or multiple of some of the aforementioned electronic apparatuses in the network environment, which may itself consist of multiple communication networks and various known or future developed wireless connectivity technologies, protocols, devices, and the like.

As shown in FIG. 1, the network environment 100 includes a network comprising an access point device 2 connected to an Internet 6 via an Internet Service Provider (ISP) 1 and also connected to different wireless devices or network devices such as one or more wireless extender access point devices 3, a proxy DIAL server device 4, and a DIAL client device 16 that may be connected in one or more wireless networks (for example, private, guest, iControl, backhaul network, or Internet of things (IoT) network) within the network environment 100. Additionally, there could be some overlap between wireless devices (for example, extender access point devices 3, a proxy DIAL server device 4, and a DIAL client device 16) in the different networks. That is, one or more network devices or wireless devices could be located in more than one network. For example, the extender access point devices 3 could be located both in a private network for providing content and information to the proxy DIAL server devices 4 and a DIAL client device 16 and also included in a backhaul network or an iControl network.

The ISP 1 can be, for example, a content provider or any computer for connecting the access point device 2 to the Internet, such as a network resource 6 that hosts one or more virtual applications 110 (such as one or more OTT applications). For example, network resource 6 can be a cloud-based service that provides an asset (such as content that comprises any of audio, video, multimedia, any other streaming content, or any combination thereof) via one or more OTT applications as virtual applications 110 via ISP 1. The connection 14 between the network resource 6 and the ISP 1 and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (for example, FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, 6G, etc. protocols. It is also contemplated by the present disclosure that connection 13 is capable of providing connections between the access point device 2 and a WAN, a LAN, a VPN, MANS, PANs, WLANs, SANs, a DOCSIS network, a fiber optics network (for example, FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for providing content received from the ISP 1 to one or more network devices (for example, a wireless extender access point devices 3, a proxy DIAL server device 4, and a DIAL client device 16) in the network environment 100. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP). While proxy DIAL server device 4 and dial client device 16 are illustrated as connected to the access point device 2 via one or more extender access point devices 3, the present disclosure contemplates that the proxy dial server device 4, the dial client device 16, or both can be directly connected to the access point device 2.

The connection 9 between the access point device 2, the wireless extender access point devices 3, the proxy DIAL server device 4, and the DIAL client device 16 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. In one or more embodiments, one or more network devices (such as any of the one or more extender access point devices 3, the proxy DIAL server device 4, the DIAL client device 16, or a combination thereof) communicate over one or more connections 9, 11 and/or 15 using UPnP SSDP and/or HTTP.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, the proxy DIAL server device 4 and/or the DIAL client device 16, which may be out of range of the access point device 2. The extender access point devices 3 can also receive signals from the proxy DIAL server device 4 and/or the DIAL client device 16 and rebroadcast the signals to the access point device 2, or any other network device.

The connections 9 and 11 between the extender access point devices 3, the proxy DIAL server device 4, the DIAL client device 16, or both are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. Additionally, the connections 9 and 11 can be implemented using a wireless connection that operates in accordance with, but is not limited to, RF4CE protocol, ZigBee protocol, Z-Wave protocol, or IEEE 802.15.4 protocol. Also, one or more of the connections 9 and 11 can be a wired Ethernet connection.

The proxy DIAL server device 4 is a network device that can implement the server side of the DIAL protocol, for example, host a proxy DIAL server so as to support virtualized OTT applications over a cloud server, such as network resource 6. In one or more embodiments, the proxy DIAL server device 4 is a first screen device. A first screen device can be, for example, a television, a set-top box (STB) (such as an IP/QAM STB), a disc player (such as a Blu-ray player), a game console, digital video recorder, a network device that provides playback of content, or a combination thereof. In one or more embodiments, the proxy DIAL server device 4 includes hardware, software or both to perform one or more functions of a DIAL protocol with respect to DIAL client device 16, for example, a DIAL discovery request.

The DIAL client device 16 is a network device that can implement the client side of the DIAL protocol. For example the DIAL client device 16 can discover a proxy DIAL server device 4 and can request to launch one or more applications at a discovered proxy DIAL server device 4. In one or more embodiments, the DIAL client device 16 is a second screen device. A second screen device can be, for example, a smartphone, a computing device (such as a tablet computer, a laptop computer, a notebook computer, a desktop computer, etc.), any other personal computing device, or a combination thereof. In one or more embodiments, any one or more of the proxy DIAL server device 4 and the DIAL client device 16 can be connected to each other and/or any one or more network devices over a connection 15. Connection 15 can be similar to or the same as any of connections 9, 10 and/or 11. Connection 15 supports at least UPnP SSDP and HTTP.

Figure 2:
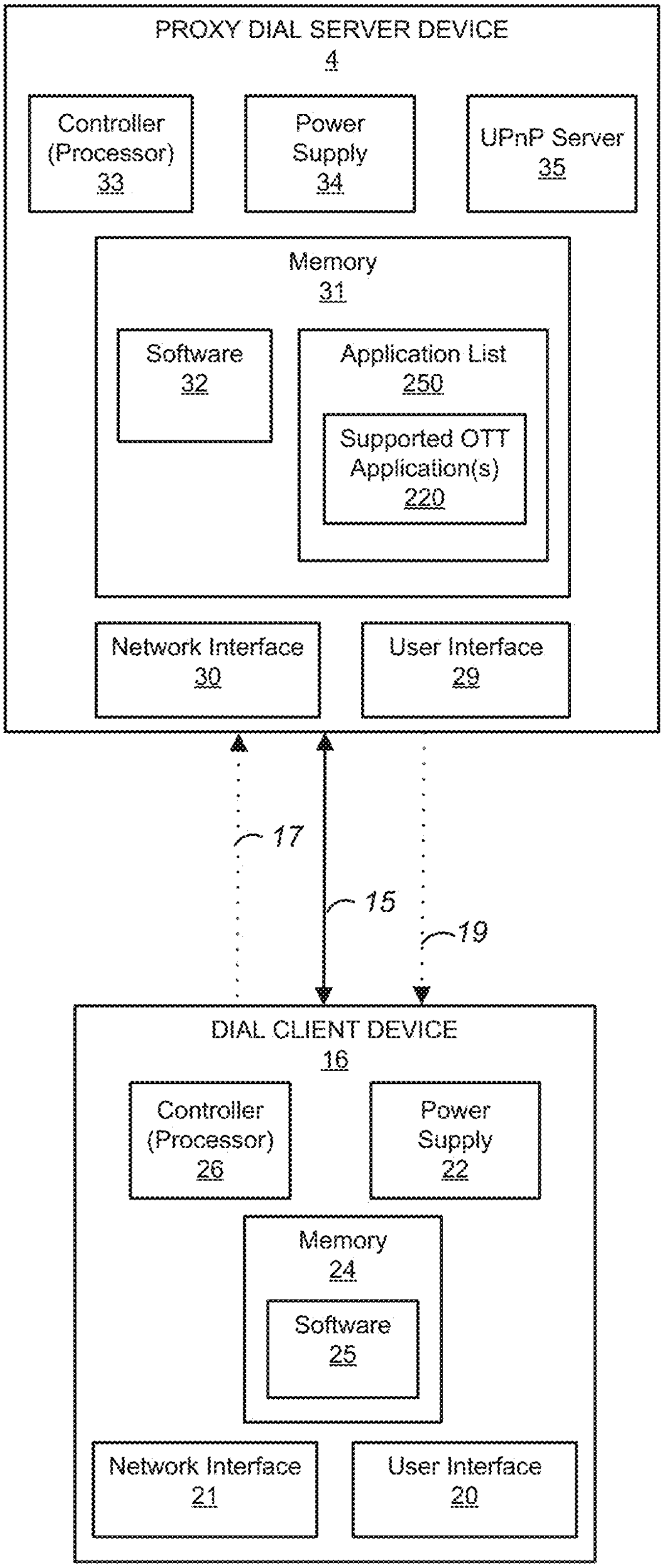
FIG. 2 is a more detailed block diagram illustrating various components of an exemplary DIAL client device and a proxy DIAL server device implemented in the network environment of FIG. 1, according to one or more aspects of the present disclosure.

A detailed description of the exemplary internal components of the proxy DIAL server device 4 and the DIAL client device 16 shown in FIG. 1 will be provided in the discussion of FIG. 2. However, in general, it is contemplated by the present disclosure that the proxy DIAL server device 4 and the DIAL client device 16 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (for example, a non-transitory computer-readable medium).

Further, any, all, or some of the computing components in the proxy DIAL server device 4 and the DIAL client device 16 may be adapted to execute any operating system, including Linux, UNIX, Windows, MacOS, DOS, and ChromOS as well as virtual machines adapted to virtualize execution of a particular operating system, including customized and proprietary operating systems. The proxy DIAL server device 4 and the DIAL client device 16 are further equipped with components to facilitate communication with other computing devices or network devices over the one or more network connections to local and wide area networks, wireless and wired networks, public and private networks, and any other communication network enabling communication in the network environment 100.

FIG. 2 is a more detailed block diagram illustrating various components of an exemplary proxy DIAL server device 4 and the DIAL client device 16 implemented in the network environment 100 of FIG. 1, according to one or more aspects of the present disclosure.

Although FIG. 2 shows only one proxy DIAL server device 4 and only one DIAL client device 16, these network devices shown in the figure are meant to be representative of one or more proxy DIAL server devices 4 and one or more DIAL client devices 16 of a network environment. Similarly, the connection 15 between the proxy DIAL server device 4 and the DIAL client device 16 in FIG. 2 is meant to be an exemplary connection and is not meant to indicate all possible connections between the proxy DIAL server device 4 and the DIAL client device 16. Additionally, it is contemplated by the present disclosure that any number of proxy DIAL server devices 4 and the number of DIAL client devices 16 can be disposed within a network environment. Further, the present disclosure contemplates that the proxy DIAL server device 4 can be connected directly and/or indirectly to a DIAL client device 16 via any one or more connections, for example, as discussed with reference to FIG. 1.

The proxy DIAL server device 4 includes a power supply 34, a user interface 29, a network interface 30, a memory 31, a controller 33, and a UPnP server 35. The proxy DIAL server device 4 can be a first screen device or can be a network device (such as a STB) that is coupled to a first screen device, for example, a first screen device includes a display for display of content received from a virtual application 110 (such as an OTT application) of a network resource 6.

The power supply 34 supplies power to the internal components of the proxy DIAL server device 4 through, for example, an internal bus. The power supply 34 can be a self-contained power source such as a battery pack with an interface to be powered through an electrical charger connected to an outlet (for example, either directly or by way of another device). The power supply 34 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the proxy DIAL server device 4, for example, for playback of content received at the proxy DIAL server device 4, for example, content from or directed to be sent by and/or from the DIAL client device 16.

The network interface 30 can include, but is not limited to, various network cards, interfaces, and circuitry implemented in software and/or hardware to enable communications with the access point device 2 and the extender access point device 3 using any one or more of the communication protocols in accordance with connection 15 (for example, as discussed with reference to FIG. 1) and/or any other connection. For example, the proxy DIAL server device 4 can be directly or indirectly connected or coupled to the DIAL client device 16 via any one or more connections (for example, as discussed with reference to FIG. 1).

The UPnP server 35 provides access to information associated with the proxy DIAL server device 4, including, but not limited to, a feature and/capability, for example, any of one or more applications or software 32 (such as an executable program, an application programming interface (API), a driver, a BIOS, etc.), one or more values indicative of a version of one or more applications or software 32, a type of connectivity, one or more accessible external devices, and any combination thereof associated with the proxy DIAL server device 4 or hosted by the proxy DIAL server device 4 that provide playback of an asset or content. In one or more embodiments, UPnP server 35 can also be and/or include an HTTP server.

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for operations of the proxy DIAL server device 4 in accordance with the embodiments described in the present disclosure. For example, software 32 can include one or more instructions for using the DIAL protocol to establish a communication connection between a virtual application 110 of a network resource 6 and a dial client device 16. In one or more embodiments, the memory 31 can store data, for example, an application list 250 received from a network resource 6. The application list 250 can comprise, such as identify, one or more supported OTT applications 220. The one or more supported OTT applications 220 indicate one or more OTT applications that are supported by the network resource 6 such that the one or more supported OTT applications 220 can be virtualized by the proxy DIAL server device 4.

The controller 33 controls the general operations of the proxy DIAL server device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 in accordance with the embodiments described in the present disclosure. Communication between any one or more components of the proxy DIAL server device 4 may be established using an internal bus. In one or more embodiments, the controller or processor 33 executes one or more instructions of software 32 to use the DIAL protocol to communicate with a network resource 6, such as a virtual application 110 hosted by the network resource 6, and a DIAL client device 16.

The DIAL client device 16 includes one or more components for providing and/or directing content received from a virtual application 110 of a network resource 6 to a first screen device, such as the proxy DIAL server device 4. The DIAL client device 16 includes a power supply 22, a user interface 20, a network interface 21, a memory 24, and a controller 26. In FIG. 2, the DIAL client device 16 is a second screen device. In one or more embodiments, the proxy DIAL server device 4 is coupled to a first screen device that includes a display.

The user interface 20 can include, but is not limited to, push buttons, a keyboard, a keypad, an LCD, a TFT, an LED, an HD or other similar display device including a display device having touch screen capabilities so as to allow interaction between a user and the DIAL client device 16. In one or more embodiments, the user interface 20 provides an interface, such as a command-line interface, a graphical user interface, an interface output port for connection to a display, and/or another type of user interface, that allows a user to view one or more of a list or menu of discovered second screen devices.

The network interface 21 may include various network cards, and circuitry implemented in software and/or hardware to enable communications with any one or more network devices including, but not limited to, the proxy DIAL server device 4 whether directly or indirectly using the communication protocols in accordance with connection 15 (for example, as described with reference to FIG. 1) and/or any other connections. Additionally, the various network cards, interfaces, and circuitry of the network interface 21 enable communications with ISP 1, whether directly or indirectly, so as to obtain content from network resource 6.

The power supply 22 supplies power to the internal components of the DIAL client device 16 through an internal bus. The power supply 22 can be connected to an electrical outlet (for example, either directly or by way of another device) via a cable or wire.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the DIAL client device 16, for example, sending a DIAL discovery request to one or more network devices such as the proxy DIAL server device 4 and communicating with a virtual application 110 of a network resource 6 via a communication connection established by the proxy DIAL server device 4.

The controller 26 controls the general operations of the proxy DIAL client device 16. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for discovering one or more network devices, such as proxy DIAL server device 4. Communication between any one or more of the components of the DIAL client device 16 may be established using an internal bus. The controller 26 may also be referred to as a processor, generally.

In one or more embodiments, the DIAL client device 16 is a second screen device where the processor 26 executes one or more instructions of software 25 that are stored in the computer-readable memory 24 so as to send requests 17 and receive responses 19 using the DIAL protocol via a connection 15, for example, to any one or more network devices connected to a network, for example, as discussed with reference to FIG. 1. A processor 33 can execute one or more computer-readable instructions of a software 32 stored in a computer-readable memory 31 so as to establish a communication connection between a network resource 6 and a DIAL client device 16.

In one or more embodiments, the software 32 can include one or more applications, drivers, utilities and/or any other resources required for establishing a communication connection with a network resource 6, a proxy DIAL server device 4 or both so as to direct that a content or an asset be directed for playback at the proxy DIAL server device 4. In one or more embodiments, one or more parameters, one or more features, one or more capabilities, any other resource, or a combination thereof of the software 32 and/or any one or more other computer-readable medium instructions can be periodically revised, loaded, updated or upgraded, for example, a version update to and/or new installation of one or more video/audio encoders/decoders (CODECs) (such as any video format including, but not limited to, any of V9 4K, H264 4K, H264 1080p, etc. and/or any audio format including, but not limited to, any of advanced audio coding (AAC), Opus, etc.), one or more digital rights management (DRM) tools, one or more security features, a trusted execution environment (TEE) technology, high-bandwidth digital content protection (HDCP) technology, any other content playback functionality, or a combination thereof can be received and applied at the proxy DIAL server device 4.

Figure 3:
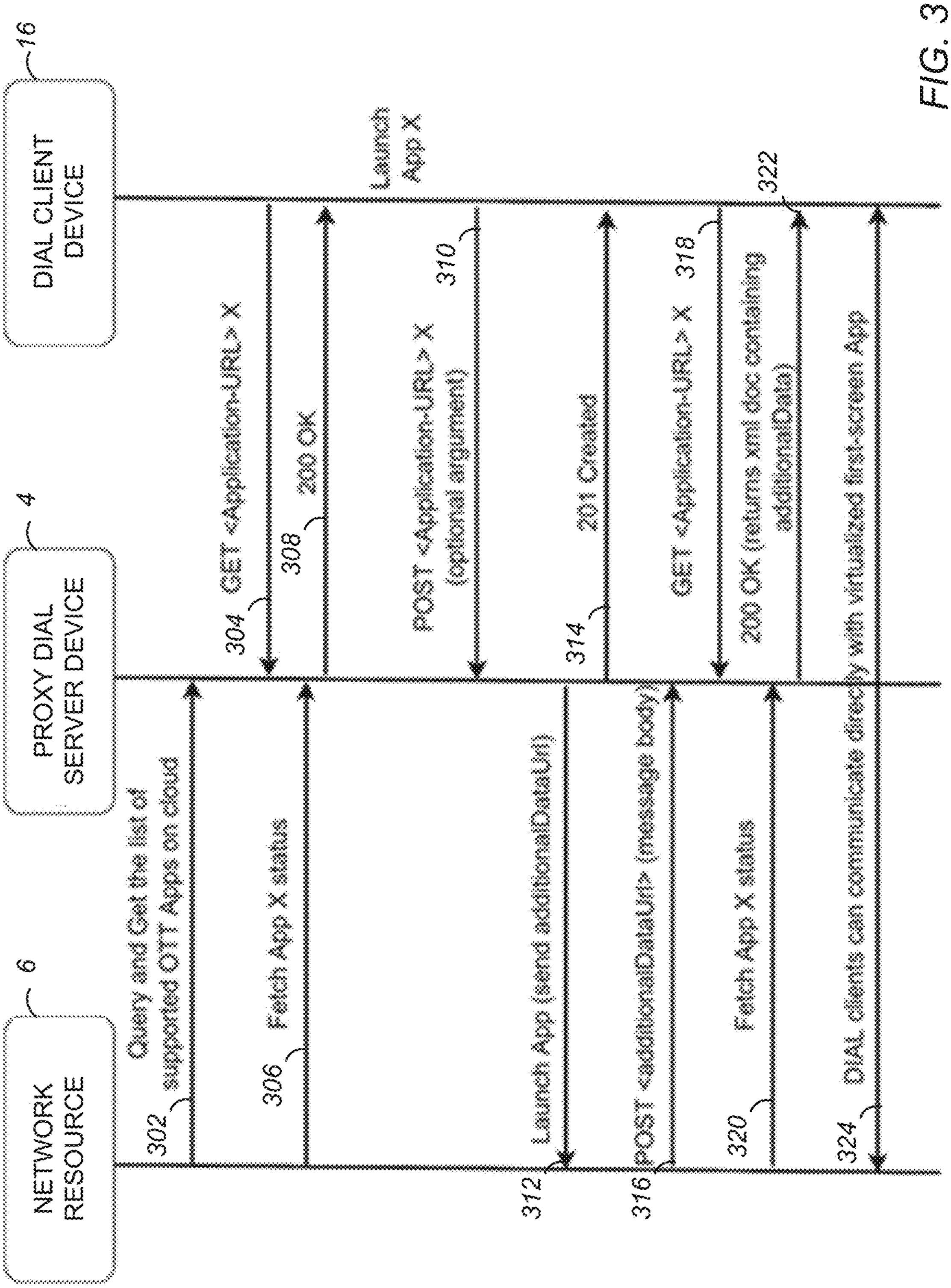
FIG. 3 illustrates a flow diagram for cloud-based virtualized OTT application launch, according to one or more aspects of the present disclosure.

FIG. 3 illustrates a flow diagram for illustrates a flow diagram for cloud-based virtualized OTT application launch, according to one or more aspects of the present disclosure. Generally, OTT applications run on a first screen device, for example, an end-user device, such as a STB, a television, a combination of such devices, etc. The DIAL protocol can be utilized for discovery and launch such that a second screen device, such as a mobile phone, can discover the second screen device, the end-user device, easily and case content to the first screen device. However, when OTT applications are virtualized, hosted by a cloud server such as network resource 6, such discovery and launch via the DIAL protocol is missing. To bridge this gap, the first screen device acts as a proxy DIAL server device to establish a connection between the virtualized OTT application running at the network resource 6 and the second screen device.

According to one or more aspects of the present disclosure, as illustrated in FIG. 3, a proxy DIAL server device 4 is disposed or located within a network environment at a site, such as a home network environment at a home or office of a user, can establish a connection with a network resource 6, such as a cloud-based server of an OTT application for providing content or an asset. The proxy DIAL server device 4 can contact the network resource 6 to fetch details about one or more OTT applications supported by the network resource 6 or available for access by the proxy DIAL server device 4. The proxy DIAL server device 4 acts as a proxy DIAL server for the one or more OTT applications hosted at the network resource 6 and available to the proxy DIAL server device 4. The proxy DIAL server device 4 can host a DIAL server with reported OTT applications being supported and manage and/or respond to REST (representational state transfer) service queries from a dial client device 16 (such as a second screen device), for example, a mobile phone within proximity of the proxy DIAL server device 4.

According to one or more aspects of the present disclosure, at 302, a network resource 6 returns a list of supported OTT applications in response to a query request (for example, an HTTP Query/Get request) from the proxy DIAL server device 4.

At 304, the DIAL client device 16, sends an application request (for example, an HTTP GET request) to the proxy DIAL server device 4 to obtain one or more OTT applications from a uniform resource location (URL) (for example, an HTTP GET <Application-URL> X, where "X" represents the one or more OTT applications). For example, the application request can request a specific OTT application supported or accessible by the proxy DIAL server device 4.

At 306, the proxy DIAL server device 4 receives an application status associated with one or more OTT applications in response to an application status request (for example, a JavaScript fetch method, where "App X" indicates that OTT application "X" from 304 associated with the application status requested) from the proxy DIAL server device 4. The application status request is based on an application list that comprises one or more supported OTT applications from 302 that includes at least one of the one or more OTT applications identified by the URL at 304.

At 308, the proxy DIAL server device 4 sends an application status response to the DIAL client device 16 (for example, an HTTP response with response code "200 OK") based on the application status at 306, for example, based on the application list.

At 310, in response to receiving the application status at 308 based on the application list, the DIAL client device 16 determines to launch an OTT application of the application list on the proxy DIAL server device 4. The DIAL client device 16 sends a launch OTT application request (for example, an HTTP POST <Application-URL> X) to the proxy DIAL server device 4. The launch OTT application request comprises application information associated with the OTT application requested to be launched. The proxy DIAL server device 4 can then communicate with the corresponding virtual OTT application at the network resource 6 so as to launch the specified OTT application as a virtualized OTT application.

At 312, the proxy DIAL server device 4 in response to the launch OTT application request at 310 sends a launch request to the network resource 6. The launch request comprises information associated with the OTT application requested to be launched by the DIAL client device 16 at 310 and additional data URL used to notify application specific custom data.

At 314, the proxy DIAL server device 4 sends a created response to the DIAL client device 16.

At 316, the proxy DIAL server device 4 receives an additional application response from the network resource 6 (for example, an HTTP POST <additionalDataUrl> (message body)). The additional data URL (additionalDataUrl) is an application specific custom data which assists a DIAL client device 16 to establish App-to-App proprietary data communication.

At 318, the DIAL client device 16 sends an additional application request (for example, an HTTP GET <Application-URL> X) to the proxy DIAL server device 4. This additional application request is to fetch the current status of an OTT application on a first screen device (for example, a virtualized OTT application launched by the proxy DIAL server device 4 at the network resource 6).

At 320, the proxy DIAL server device 4 can receive from the network resource 6 an additional application status at 320 of the virtual OTT application (for example, a JavaScript fetch method, where "App X" indicates that OTT application "X" from 318 associated with the additional application status requested) a based on the additional application request at 318.

At 322, the proxy DIAL server device 4 sends an additional application status response to the DIAL client device 16 (for example, an HTTP response with response code "200 OK" with an XML document containing "additionalData") based on the additional application status at 320.

At 324, a communication connection is established between the network resource 6 (for example, the virtual OTT application hosted at the network resource 6) and the DIAL client device 16. For example, the DIAL client device 16 can communicate directly with a virtualized OTT application (a virtualized first-screen application).

According to one or more aspects of the present disclosure, the DIAL client device 16 can request that the launched OTT application be closed or that the proxy DIAL server device 4 should no longer access the OTT application. The proxy DIAL server device 4 can send a close application request to the network resource 6 and receive from the network resource 6 a close status response. The close status response can be communicated from the proxy DIAL server device 4 to the DIAL client device 16.

When a DIAL client device 16 (a second screen device, for example, a smart phone) wants to cast media content to a proxy DIAL server device 4 (a first screen device, for example, a STB), the DIAL client device 16 sends one or more optional OTT application arguments, for example, a pairing-code, a video-content-identifier to be played, a time position of content to resume, a theme, etc. The one or more optional OTT application arguments can be sent over an HTTP POS REST request from DIAL client device 16 to the proxy DIAL server device 4. For example:

pairingCode=XYZ&v=<example-video-identifier>&t=300&additionalDataURL=HTTP://<ip-addr>/<port>/apps/<AppName>/dial_data The proxy DIAL server running on the proxy DIAL server device 4 can receive the one or more optional OTT application arguments and pass the one or more optional OTT application arguments toa virtual OTT application of the network resource 6 along with additional information (such as additionalDataUrl). The virtual OTT application (the OTT application virtualized at the network resource 6) uses the additional information to POST the DIAL-data as payload by sending the DIAL-data directly to the proxy DIAL server device 4 or sending to the local HTTP service on a cloud instance running the virtual OTT application at the network resource 6 (for example, the cloud instance running the virtual OTT application can redirect the DIAL-data to the proxy DIAL server device 4 over a proprietary link). Based on the method of the POST, the IP address (ip-address) in the additional information (additionalDataUrl) is framed accordingly. For example, the DIAL-data posted by the virtualized OTT application to the proxy DIAL server device 4 contains XML, such as:

```
<additionalData>
<screenId>ExampleScreenId</screenId>
<deviceId>ABC</deviceId>
</additionalData>
```

Whenever the DIAL client device 16 (for example, a smart phone as a second screen device) requests to get the OTT application status, the proxy DIAL server device 4 passes the DIAL-data, for example, as illustrated in the XML above, in an HTTP response back to the DIAL client device 16. The DIAL-data assists the DIAL client device 16 to directly establish communication with the virtual OTT application at the network resource 6, for example, the virtualized OTT application hosted in the cloud. For example, a communication connection between the DIAL client device 16 to the network resource 6 could be over a websocket. In one or more embodiments, the communication connection between the network resource 6 and the DIAL client device 16 can be bridged and routed over the proxy DIAL server device 4.

Figure 4:
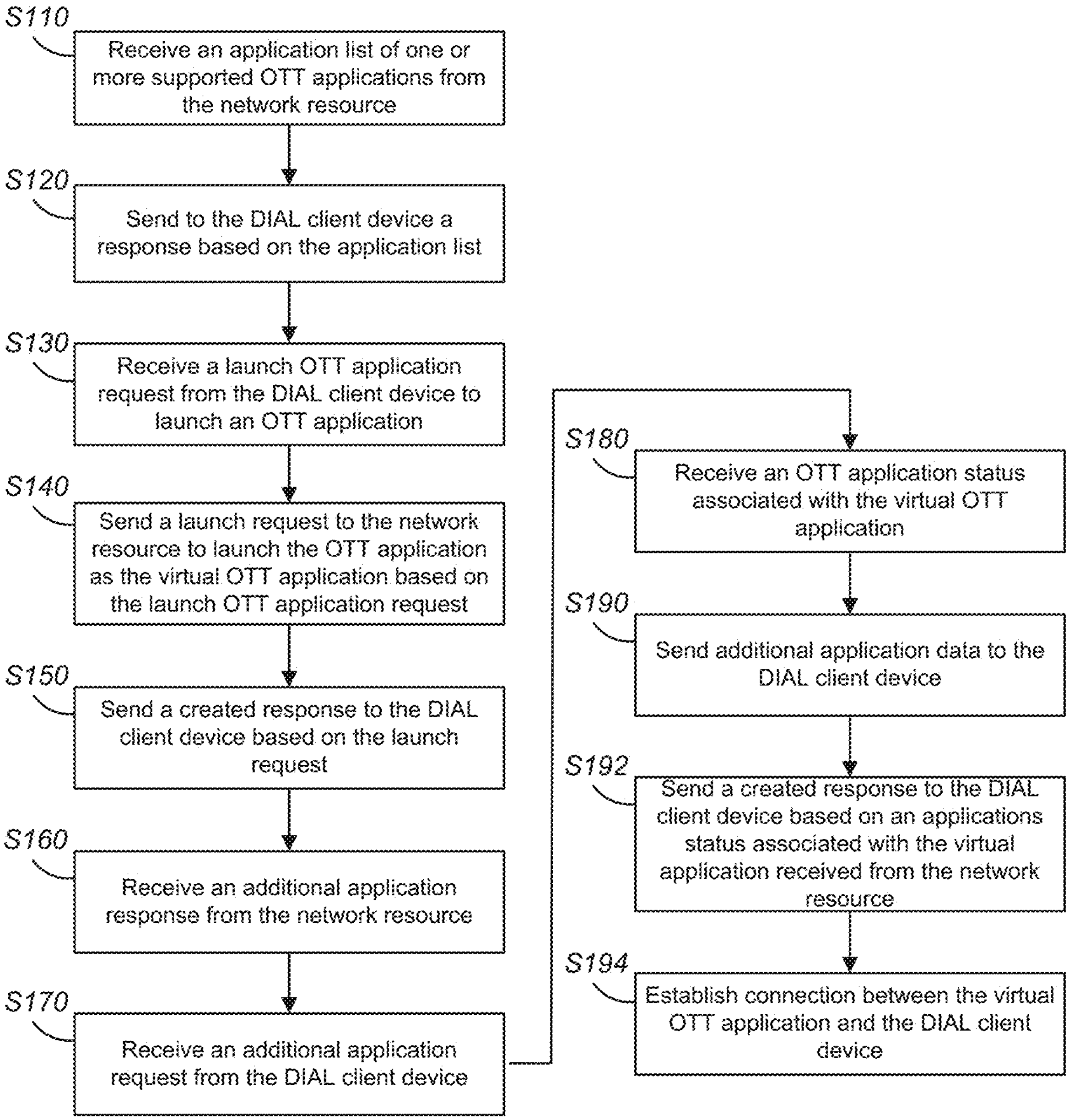
FIG. 4 is a flow chart illustrating a method for a proxy DIAL server device to establish a connection between a virtual OTT application at a network resource and a DIAL client device, according to one or more aspects of the present disclosure.

FIG. 4 is a flow chart illustrating a method for a proxy DIAL server device to establish a connection between a virtual OTT application at a network resource and a DIAL client device, according to one or more aspects of the present disclosure.

The proxy DIAL server device 4 may be programmed with one or more instructions, such as software 32, that when executed by a processor or controller 33 causes the proxy DIAL server device 4 to perform one or more operations including, but not limited to, establish a connection, such as a communication connection, between an OTT application at a network resource and a DIAL client device 16, according to one or more aspects of the present disclosure. In one or more embodiments, the proxy DIAL server device 4 is referred to as a first screen device. In FIG. 4, it is assumed that any one or more of the devices include their respective controllers and their respective software stored in their respective memories, as discussed above in connection with FIGS. 1-3, which when executed by their respective controllers perform the functions and operations in accordance with the example embodiments of the present disclosure.

The proxy DIAL server device 4 comprises a controller 33 that executes one or more computer-readable instructions, stored on a memory 31, that when executed perform one or more of the operations of steps S110-S194. In one or more embodiments, the one or more instructions can be one or more software applications, for example, one or more software 32. While the steps S110-S194 are presented in a certain order, the present disclosure contemplates that any one or more steps can be performed simultaneously, substantially simultaneously, repeatedly, in any order or not at all (omitted).

At step S110, the proxy DIAL server device 4 receives an application list of one or more supported OTT applications from the network resource 6. For example, the proxy DIAL server device 4 can query or send a request to the network resource 6 and in response can receive the one or more supported applications, for example, as discussed with respect to 302 of FIG. 3. The proxy DIAL server device can store the application list in a memory of the proxy DIAL server device 4.

At step S120, the proxy DIAL server device 4 sends to the DIAL client device 16 a response, for example, an application status response with respect to 308 of FIG. 3, based on the application list received from the network resource 6. The response can be sent to the DIAL client device 16 after the proxy DIAL server device 4 receives a request from the DIAL client device 16, for example, an HTTP Query/GET request as discussed with respect to 304 of FIG. 3.

At step S130, the proxy DIAL server device 4 receives a launch OTT application request from the DIAL client device 16 to launch an OTT application, for example, as discussed with respect to 310 of FIG. 3. The application list comprises the OTT application.

At step S140, the proxy DIAL server device 4 sends a launch request to the network resource 6 to launch the OTT application as the virtual OTT application based on the launch OTT application request, for example, as discussed with respect to 312 of FIG. 3.

At step S150, the proxy DIAL server device 4 sends a created response to the DIAL client device 16 based on the launch request, for example, as discussed with respect to 314 of FIG. 3.

At step S160, the proxy DIAL server device 4 receives an additional application response from the network resource 6, for example, as discussed with respect to 316 of FIG. 3.

At step S170, the proxy DIAL server device 4 receives an additional application request from the DIAL client device 16, for example, as discussed with respect to 318 of FIG. 3.

At step S180, the proxy DIAL server device 4 receives an OTT application status associated with the virtual OTT application, for example, as discussed with respect to 320 of FIG. 3.

At step S190, the proxy DIAL server device 4 sends additional application data to the DIAL client device 16, for example, as discussed with respect to 322 of FIG. 3.

At step S192, the proxy DIAL server device 4 sends a created response to the DIAL client device 16 based on an applications status associated with the virtual application received from the network resource 6, for example, similar to as discussed with respect to 314 of FIG. 3.

At step S194, the proxy DIAL server device 4 establishes a connection between the virtual OTT application and the DIAL client device 16, for example, as discussed with respect to 324 of FIG. 3.

According to some example embodiments of inventive concepts disclosed herein, there are provided novel solutions for establishing a connection, for example, a communication connection, between a virtualized OTT application at a network resource and a DIAL client device by a proxy DIAL server device utilizing the DIAL protocol. The novel solutions according to example embodiments of inventive concepts disclosed herein provide features that extend the DIAL protocol to support network-based (for example, cloud-based) virtualized OTT applications without modifying the DIAL protocol specification, support futuristic network architecture for OTT applications, and enhance customer experience by providing support for various products.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A method for a proxy discovery and launch (DIAL) server device to establish a connection between a virtual over-the-top (OTT) application of a network resource and a DIAL client device, the method comprising:

receiving an application list of one or more supported OTT applications from the network resource;

sending to the DIAL client device a response based on the application list;

receiving a launch OTT application request from the DIAL client device to launch an OTT application, wherein the application list comprises the OTT application;

sending a launch request to the network resource to launch the OTT application as the virtual OTT application based on the launch OTT application request; and establishing the connection between the virtual OTT application and the DIAL client device.

2. The method of claim 1, further comprising:

sending a created response to the DIAL client device based on the launch request.

3. The method of claim 1, further comprising:

receiving an additional application response from the network resource.

4. The method of claim 3, further comprising:

receiving an additional application request from the DIAL client device.

5. The method of claim 1, further comprising:

receiving an OTT application status associated with the virtual OTT application.

6. The method of claim 1, further comprising:

sending additional application data to the DIAL client device.

7. The method of claim 6, the method further comprising:

sending a created response to the DIAL client device based on an application status associated with the virtual application received from the network resource.

8. A proxy discovery and launch (DIAL) server device for establishing a connection between a virtual over-the-top (OTT) application at a network resource and a DIAL client device, comprising:

a memory storing one or more computer-readable instructions;

a processor configured to execute the one or more computer-readable instructions to:

receive an application list of one or more supported OTT applications from the network resource;

send to the DIAL client device a response based on the application list;

receive a launch OTT application request from the DIAL client device to launch an OTT application, wherein the application list comprises the OTT application;

send a launch request to the network resource to launch the OTT application as the virtual OTT application based on the launch OTT application request; and establish the connection between the virtual OTT application and the DIAL client device.

9. The proxy DIAL server device of claim 8, wherein the processor is configured to execute one or more further instructions to:

send a created response to the DIAL client device based on the launch request.

10. The proxy DIAL server device of claim 8, wherein the processor is configured to execute one or more further instructions to:

receive an additional application response from the network resource.

11. The proxy DIAL server device of claim 10, wherein the processor is configured to execute one or more further instructions to:

receive an additional application request from the DIAL client device.

12. The proxy DIAL server device of claim 8, wherein the processor is configured to execute one or more further instructions to:

receive an OTT application status associated with the virtual OTT application.

13. The proxy DIAL server device of claim 8, wherein the processor is configured to execute one or more further instructions to:

send additional application data to the DIAL client device.

14. The proxy DIAL server device of claim 8, wherein the processor is configured to execute one or more further instructions to:

send a created response to the DIAL client device based on an application status associated with the virtual application received from the network resource.

15. A non-transitory computer-readable medium of a proxy discovery and launch (DIAL) server device storing one or more instructions for establishing a connection between a virtual over-the-top (OTT) application of a network resource and a DIAL client device, which when executed by a processor of the proxy DIAL server device, cause the proxy DIAL server device to perform one or more operations comprising:

receiving an application list of one or more supported OTT applications from the network resource;

sending to the DIAL client device a response based on the application list;

receiving a launch OTT application request from the DIAL client device to launch an OTT application, wherein the application list comprises the OTT application;

sending a launch request to the network resource to launch the OTT application as the virtual OTT application based on the launch OTT application request; and establishing the connection between the virtual OTT application and the DIAL client device.

16. The non-transitory computer-readable medium of claim 15, wherein the one or more instructions, when executed by the processor, further cause the proxy DIAL server device to perform one or more further operations comprising:

sending a created response to the DIAL client device based on the launch request.

17. The non-transitory computer-readable medium of claim 15, wherein the one or more instructions, when executed by the processor, further cause the proxy DIAL server device to perform one or more further operations comprising:

receiving an additional application response from the network resource.

18. The non-transitory computer-readable medium of claim 17, wherein the one or more instructions, when executed by the processor, further cause the proxy DIAL server device to perform one or more further operations comprising:

receiving an additional application request from the DIAL client device.

19. The computer-readable medium of claim 15, wherein the one or more instructions, when executed by the processor, further cause the proxy DIAL server device to perform one or more further operations comprising:

receiving an OTT application status associated with the virtual OTT application.

20. The computer-readable medium of claim 15, wherein the one or more instructions, when executed by the processor, further cause the proxy DIAL server device to perform one or more further operations comprising at least one of:

sending additional application data to the DIAL client device; and sending a created response to the DIAL client device based on an application status associated with the virtual application received from the network resource.

* * * * *